UNITED STATES PATENT OFFICE.

KARL F. STAHL, OF PITTSBURGH, PENNSYLVANIA.

METHOD OF MAKING SODIUM SILICOFLUORID.

1,247,165.  Specification of Letters Patent.  Patented Nov. 20, 1917.

No Drawing.  Application filed March 17, 1917. Serial No. 155,480.

*To all whom it may concern:*

Be it known that I, KARL F. STAHL, a resident of Pittsburgh, in the county of Allegheny and State of Pennsylvania, have invented a new and useful Improvement in Methods of Making Sodium Silicofluorid, of which the following is a specification.

The invention relates to a process of treating phosphate rock.

Phosphate rock contains some fluorin as calcium fluorid and silicic acid either free as silica, or combined as silicates. In the process of making acid phosphate for use as a fertilizer the ground phosphate rock is mixed with sulfuric acid which has previously been diluted to the required strength. This converts the tertiary calcium phosphate into primary phosphate, rendering it soluble in water, but it also liberates the fluorin of the calcium fluorid, forming hydrofluoric acid. This acid in turn combines with the silica forming principally silicon fluorid ($SiF_4$), which, as a gas, escapes into the air and is detrimental to surrounding property. In order to prevent the escape of this gas, the silicon fluorid is brought into contact, in suitable apparatus, with sprays of water, and this decomposes the silicon fluorid into hydrofluosilicic acid and silicic acid according to the equation:

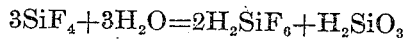

The hydrofluosilicic acid is immediately absorbed in the water in which the silicic acid remains suspended. The two are separated by means of a filter press and the hydrofluosilicic acid is converted into sodium silicofluorid, a useful product, by means of a solution of sodium chlorid, according to the equation:

$$H_2SiF_6 + 2NaCl = Na_2SiF_6 + 2HCl.$$

This leaves a weak solution of hydrochloric acid which is of little value and cannot be utilized in the process. In locations where there is no large body of water it is necessary to make some arrangements for the disposal of this weak solution of hydrochloric acid which is produced in considerable quantity. This problem becomes very difficult in some cases and practically prohibits the erection of a plant for the production of sodium silico fluorid where such plant would otherwise be most favorably situated.

One of the objects of the present invention is to provide an improved process for treating phosphate rock in which resulting products of value or ones which may be easily disposed of are produced.

Another object is to provide an improved process for treating phosphate rock in which the product resulting from the conversion of hydrofluosilicic acid into sodium silicofluorid may be utilized in the process of treating the rock.

Other objects and advantages of the invention will appear from the following specification:

The phosphate rock, according to the improved process, is treated with sulfuric acid which renders the phosphate soluble in water and produces hydrofluoric acid. This acid combines with the silica, forming principally silicon fluorid ($SiF_4$), which afterward is decomposed into silicic acid and hydrofluosilicic acid and this latter acid is then absorbed in water. Instead of treating this solution with sodium chlorid, it is treated with a solution of sodium sulfate which precipitates sodium silicofluorid according to the following equation:—

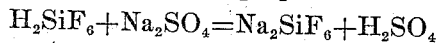

The sodium silicofluorid is sparsely soluble in water or in dilute sulfuric acid, and consequently is thrown down as a fine powder or sludge, which is separated from the liquid by a suitable filtering device, such as a filter press or centrifugal machine. It is then washed free of acid, dried and ground, whereupon it is ready for shipment.

The dilute sulfuric acid which is produced by this reaction may be utilized in the process of treating the phosphate rock so that no provision need be made for the disposition of large quantities of waste acid liquid. For the purpose of acidulating the phosphate rock in the initial reaction sulfuric acid of 50° Baumé, is generally used. In the usual chamber process of making sulfuric acid the latter is usually produced stronger than 50° Baumé and to use it for acidulating phosphate rock it is diluted with water to reduce its strength. In the present process, instead of diluting this acid with water, it is diluted with the sulfuric acid solution obtained in the final stage of the process. Such solution generally contains sulfuric acid in a dilute state of about 7° Baumé. The acid solution resulting from the process is thus not only disposed of but it is utilized in the treatment of the phosphate rock.

Sodium sulfate and acid sulfate may be obtained in the form of salt cake and niter cake respectively, which are waste products from the manufacture of hydrochloric and nitric acid. They are relatively inexpensive and often contain some free sulfuric acid. In such case more sulfuric acid or a stronger acid is obtained in the final stage of the process which may be used in treating the rock.

The process herein described thus enables the waste cake from the nitric or hydrochloric acid processes to be used which has a very important practical advance in the chemical art since the problem of disposing of this waste cake has often been a very difficult one to solve. In addition to disposing of the waste products from these acid processes, the use of such products in treating phosphate rock produces a resulting acid solution which may be again used in the initial step of treating the rock. The waste products of two processes are thus saved and the difficulty of disposing of them avoided.

An additional advantage is secured by the use of the sodium sulfate in that the sulfuric acid does not affect the apparatus for handling the precipitated sodium silicofluorid to as great an extent as the hydrochloric acid heretofore produced and therefore it renders the process more inexpensive by reason of the reduction in the replacements of apparatus.

What is claimed is:

1. The process of producing sodium silicofluorid, which comprises treating hydrofluosilicic acid with a sodium sulfate.

2. The process of producing sodium silicofluorid, which comprises treating hydrofluosilicic acid with niter cake.

3. A process which comprises treating the hydrofluosilicic acid solution resulting from acidulating phosphate rock containing fluorid with a sodium sulfate to produce sodium silicofluorid and sulfuric acid.

4. The process of treating the hydrofluosilicic acid solution resulting from acidulating phosphate rock containing fluorid with niter cake to produce sodium silicofluorid and sulfuric acid.

5. The process of treating phosphate rock containing fluorid to produce a soluble phosphate without producing waste products, which comprises acidulating the phosphate rock with sulfuric acid to produce a soluble phosphate, treating the resulting silicon fluorid to produce hydrofluosilicic acid solution and treating said acid solution with a sodium sulfate to produce sodium silicofluorid and surfuric acid.

6. The process of treating phosphate rock containing fluorid to produce a soluble phosphate and other usable products which comprises acidulating the phosphate rock with sulfuric acid to produce a soluble phosphate and treating the resulting silicon fluorid to produce hydrofluosilicic acid solution and treating said acid solution with niter cake to produce sodium silicofluorid and sulfuric acid.

7. The process of treating phosphate rock containing fluorid to produce usable products and a solution suitable for re-use in the process, which comprises acidulating phosphate rock with sulfuric acid to produce a soluble phosphate, treating the resulting silicon fluorid to produce hydrofluosilicic acid, treating said acid with a sodium sulfate to produce sodium silicofluorid and sulfuric acid, and utilizing the sulfuric acid solution for acidulizing another quantity of phosphate rock.

8. The process of treating phosphate rock containing fluorid to produce usable products and a solution suitable for re-use in the process, which comprises acidulating phosphate rock with sulfuric acid to produce a soluble phosphate, treating the resulting silicon fluorid to produce hydrofluosilicic acid, treating the said acid with niter cake to produce sodium silicofluorid and sulfuric acid, and utilizing the sulfuric acid solution in the acidulating of other phosphate rock.

9. The process of utilizing otherwise waste products from the acidulating of phosphate rock containing fluorid and from the nitric acid process, which comprises treating the hydrofluosilicic acid solution resulting from the acidulating of the phosphate rock with the cake residue of the nitric acid process to produce sodium silicofluorid and sulfuric acid.

10. The process of utilizing otherwise waste products from the acidulating of phosphate rock containing fluorid and a sodium sulfate from an acid producing process, which comprises treating the hydrofluosilicic acid solution resulting from the acidulating of the phosphate rock with the cake residue of the acid process to produce sodium silicofluorid and sulfuric acid.

In testimony whereof, I have hereunto set my hand.

KARL F. STAHL.

Witness:
GLENN H. LERESCHE.